United States Patent
Piepereit

(10) Patent No.: US 6,568,568 B1
(45) Date of Patent: May 27, 2003

(54) MATERIALS HANDLING APPARATUS

(75) Inventor: Edward John Piepereit, Moreton-in-Marsh (GB)

(73) Assignee: Matcon (R&D) Limited (GB)

( * ) Notice: Subject to any disclaimer, the term of this patent is extended or adjusted under 35 U.S.C. 154(b) by 0 days.

(21) Appl. No.: 09/830,641

(22) PCT Filed: Oct. 14, 1999

(86) PCT No.: PCT/GB99/03408
§ 371 (c)(1),
(2), (4) Date: Aug. 2, 2001

(87) PCT Pub. No.: WO00/26120
PCT Pub. Date: May 11, 2000

(30) Foreign Application Priority Data

Oct. 29, 1998 (GB) ............................................. 98237209

(51) Int. Cl.⁷ ................................................. B67D 5/06
(52) U.S. Cl. .................................... 222/185.1; 222/559
(58) Field of Search ............................. 222/185.1, 559

(56) References Cited

U.S. PATENT DOCUMENTS 3,971,493 A    7/1976  Williams .................... 222/185
5,743,439 A *  4/1998  Semenenko ............... 222/185.1

FOREIGN PATENT DOCUMENTS

| DE | 838980      | 5/1952 |            |
|----|-------------|--------|------------|
| DE | 1009869     | 6/1957 |            |
| DE | 4421021 A1  | 6/1994 | F16J/15/10 |
| DE | 29713153 U1 | 7/1997 | E04B/1/68  |
| EP | 0646533 A2  | 5/1995 | B65D/90/66 |
| EP | 0704394 A1  | 3/1996 | B65G/69/18 |
| EP | 0801015 B1  | 3/1997 |            |
| WO | WO 97/08080 | 3/1997 | B65D/90/62 |

* cited by examiner

Primary Examiner—Philippe Derakshani
(74) Attorney, Agent, or Firm—Ostrager Chong & Flaherty LLP

(57) ABSTRACT

An apparatus for handling flowable material, e.g., an intermediate bulk container or IBC, comprises an aperture in the form of an outlet having a closure device in the form of a discharge valve movable between a position to obturate the outlet and a position to allow flow of material through the outlet, and an integral member which is adapted to secure the valve in the obturated position. The integral member is in the form of relatively rigid annular lock or lock ring mounted between the body and a probe. This integral member is thus positioned radially inwardly of the body and has an outer peripheral surface with a step configuration complementary to that of the body.

12 Claims, 3 Drawing Sheets

MATERIALS HANDLING APPARATUS

FIELD OF INVENTION

The invention relates to materials handling apparatus, such as bins, silos or IBC's (intermediate bulk containers) which hold, transport and transfer flowable material, in particular particulates such as powders, granules, pellets, grains, pulverulent material and the like.

BACKGROUND OF INVENTION

Such materials are transferred from say an intermediate bulk container, or IBC, at a discharge station where a valve which normally closes an outlet of the IBC is actuated to open the outlet for flow therethrough of the material in a desired amount.

Typically, the IBC is set down on a discharge station where a probe thereof rises to raise the valve, usually a cone discharge valve to provide an annular opening at the outlet through which the material passes. It is extremely important that the material, which can be dangerous to the environment, does not escape, and to this end the valve needs to be secured in place during obturation of the outlet.

Hitherto separate transport caps have been used to lock the valve in place, but they are a relatively expensive separate item which can become damaged, lost or generally ineffective.

It is accordingly an object of the invention to seek to mitigate these disadvantages.

SUMMARY OF INVENTION

According to a first aspect of the invention there is provided apparatus for handling flowable particulate material, comprising an aperture having a closure device movable between a position to obturate the aperture and a position to allow flow of material therethrough, and an integral member which is adapted to secure the device in the obturated position.

The aperture may be an outlet of the apparatus and the closure device may be a discharge valve. This provides for a relatively simple construction, which may be enhanced when there may be an annular flexible seal carried by the device, and the member may be additionally adapted to urge the seal against the outlet to effect securing of the valve in the outlet.

The member may comprise a relatively rigid annular member mounted underneath the valve.

The member may be readily inwardly of the seal and may have a part to engage the seal against the outlet.

The part may comprise a free boundary edge part of the member.

The seal may comprise a substantially rigid retaining body and the body and member may be relatively slidable to effect securing in the obturated position.

There may be means to limit the respective slidable motion, which means in a preferred construction may comprise complementary stepped parts of each of the body and member.

The member may comprise a ring of relatively rigid polyethylene.

There may be additional means to retain the member below the valve.

The retaining means may comprise a spider, in one embodiment.

The aperture may be an inlet of the apparatus and the closure device may be a lid of the apparatus.

The member may be housed in a rebate of a seal

According to a second aspect of the invention there is provided a materials handling system, comprising apparatus as hereinbefore defined, and a station for charging or discharging of material through the outlet.

The station may comprise a discharge station and means to move the integral member to secure the closure device in the obturated position.

BRIEF DESCRIPTION OF THE DRAWINGS

Apparatus embodying the invention is hereinafter described, by way of example, with reference to the accompanying drawings.

DESCRIPTION OF PREFERRED EMBODIMENTS

Figure 2:
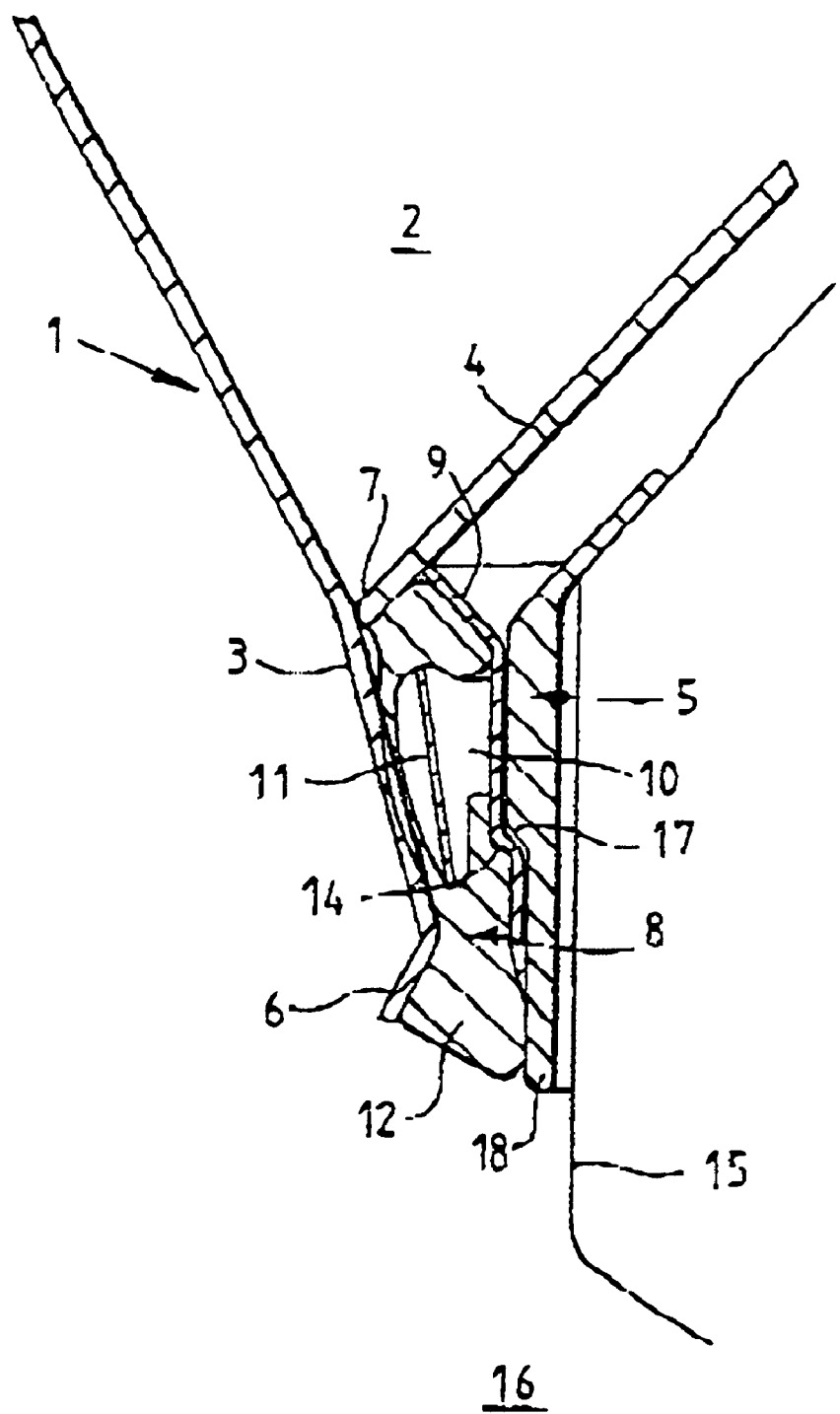
FIG. 2 is a view similar to FIG. 1 of the apparatus in a second operative position.

Referring to the drawings, there is shown apparatus 1 for handling flowable material, in the embodiment an intermediate bulk container or IBC 2, comprising an aperture in the form of an outlet 3 having a closure device in the form of a discharge valve 4 movable between a position to obturate the outlet 3 and a position to allow flow of material through the outlet, and an integral member 5 which is adapted to secure the valve 4 in the obturated position (FIG. 2).

The outlet 3 is a convergent or hopper outlet having an out-turned or flared peripheral lip or part 6 which in use is a downwardly directed part. The valve 4 is a conical discharge valve which in the position to obturate the outlet rests with its peripheral boundary edge 7 on the inner surface as viewed of the outlet hopper 23. In order to seal against undesired flow of material and to protect ambient atmosphere from possible contamination by that material, there is an annular seal 8 which is carried by the core valve 4, being supported by a relatively rigid retaining body 9 which is secured to, and depends from, the underside of the cone valve. The seal 8 is of a suitable polymeric material and is attached to the body 9. An entrapped air gap 10 enhances sealability and a strengthening member 11 serves to maintain the correct profile of the seal 8. The seal 8 has a free, and flexible, depending annular part 12 which has a surface 13 which can lie against the inner surface of the outwardly flared lip 6 of the outlet.

The body 9 has a stepped part, in the form of a sloping shoulder 14 part linking two laterally offset straight parts 14', 14".

There is a probe 15 at a discharge station 16, the integral member 5 being in the form of a relatively rigid annular lock or lock ring mounted between the body 9 and the probe. This integral member 5 is thus positioned radially inwardly of the body 9, and has an outer peripheral surface with a stepped configuration complementary to that of the body. Thus the lock ring has two laterally displaced straight surfaces 17' and 17" linked by a sloping shoulder 17 to provide the stepped configuration. The integral lock ring 5 which is in the embodiment made of relatively rigid polyethylene has an inclined part 17''' which is generally parallel to the slope of the cone valve 4 and roof of the probe 15.

The integral lock ring 5 is maintained within the cone valve and under the sloping or conical (or frusto-conical) roof by the inherent resilience of the material.

Figure 1:
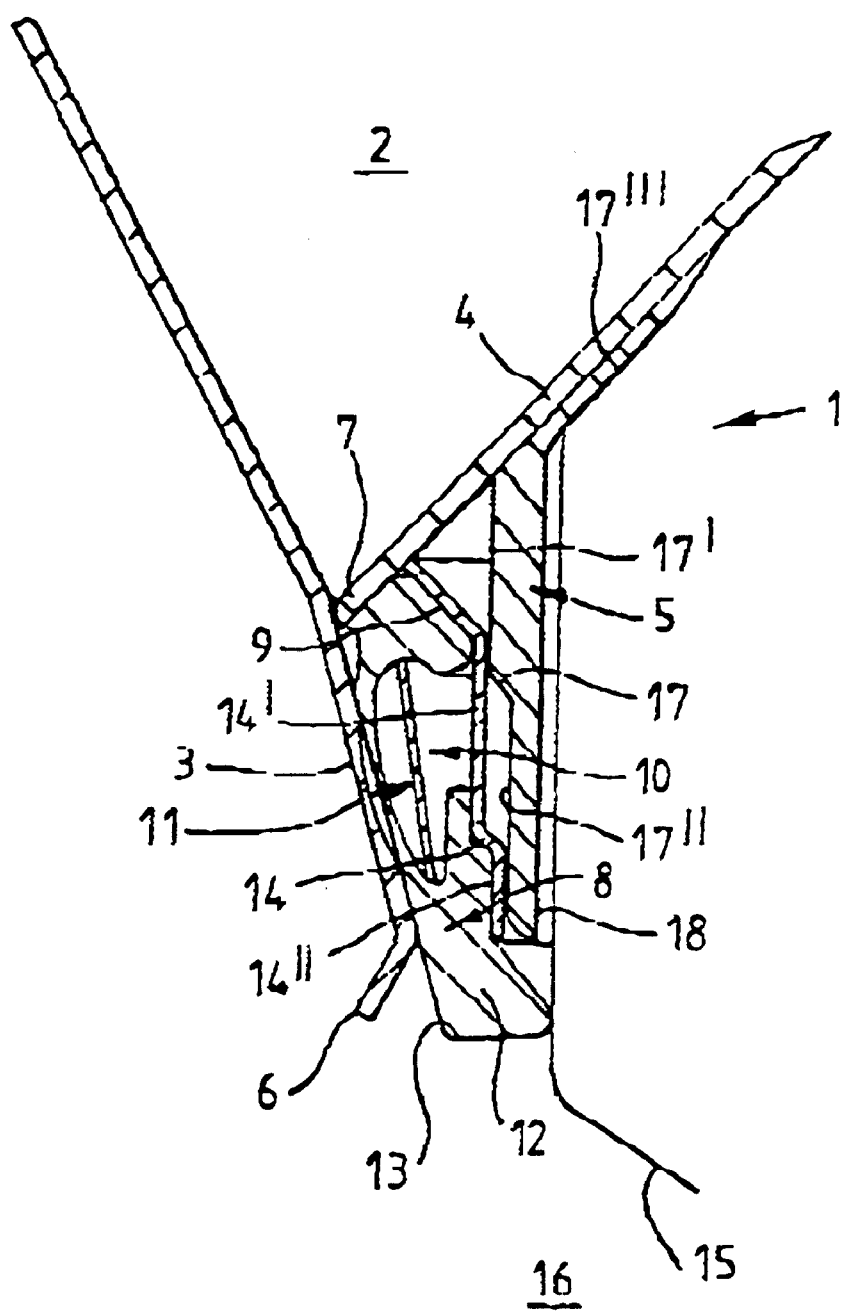
FIG. 1 is a schematic longitudinal sectional view of part a first embodiment of apparatus for handling flowable material according to the invention in a first operative position.

Whilst being integral, the lock ring 5 is nevertheless free to move between the FIG. 1 and FIG. 2 positions. In a first, unlocked, operative position, FIG. 1, the lock ring 5 is raised into contact with the cone valve 4 by the probe 15. In a second, operative locked condition, FIG. 2, the lock ring 5 is attached to the probe 15 by means (not shown) and as the probe 15 is lowered, it takes the lock ring 5 down with it, until sloping shoulder 17 is in contact with the sloping shoulder 14. The nose 18 forces the ring 12 clockwise as viewed to seal with its surface 13 against the peripheral lip 6 of the hopper.

The IBC and the station 16 comprises a discharge system.

In order to discharge material from the IBC through the outlet 3, then it is transported to the discharge station 16 and set down thereon, there being at the station the probe 15 which is raised to contact the cone valve 4 and raise it so that its peripheral edge is raised off the hopper to open an annular flow path round the edge through which material can flow.

The IBC arrives at the station with the cone valve in the locked position (FIG. 2). In this case a depending nose 18 of the lock ring 5 is in engagement with the free enlarged annular ring 12 of the seal 8 and forces it into sealing engagement with the flared outlet 6. As the probe rises, the lock ring 5 slides upwardly relatively to the body 9, so that the ring 12 under its own resilience springs to the right, anti-clockwise as viewed, to engage on and seal against the probe 15 so that on continuous lifting to open a flow path, the probe is sealed against contamination.

During this action the lock ring 5 is raised by the probe so that it slides upwardly over the body 9 to the FIG. 1 position thereby disengaging the complementary locked shoulder parts 14, 17. On continued lifting of the probe 15 beyond the FIG. 1 position, the cone valve 4 can be raised thereby to open the annular flow path, the ring 12 preventing contamination of the surfaces of the probe thereabove by the material as it exits.

After discharge, the FIG. 2 position is resumed by a device, not shown, which "grabs" the ring 5 and draws it down to the locked position shown, the probe 15 being retracted too to lower the cone valve 4 to obturate the outlet once more.

In an alternative, not shown, the integral lock ring 5 may also be retained in position within the cone valve by a retainer device such as an annular spider.

The integral lock ring is within the apparatus, below the sloping conical (or frusto-conical) part thereof at an outlet, and in the locked position retains the cone valve firmly in position and prevents dislodgement thereof.

Figure 3:
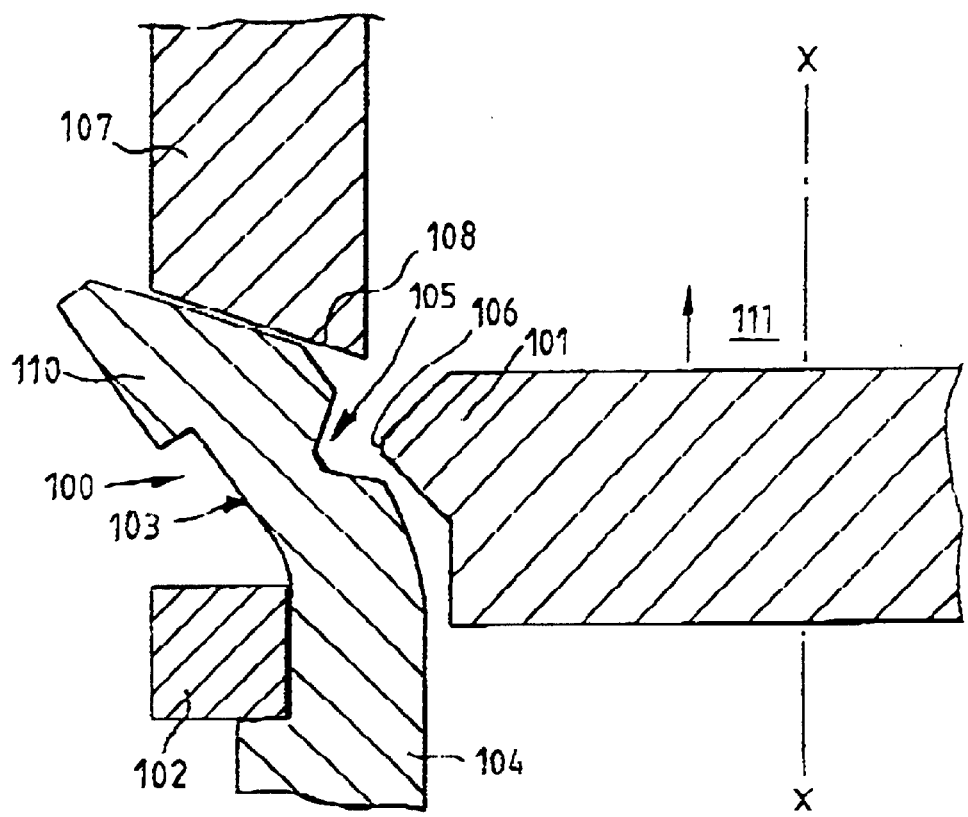
FIG. 3 is to an enlarged schematic longitudinal sectional view a part of a second embodiment of apparatus for handling flowable material according to the invention in a first operative position.
Figure 4:
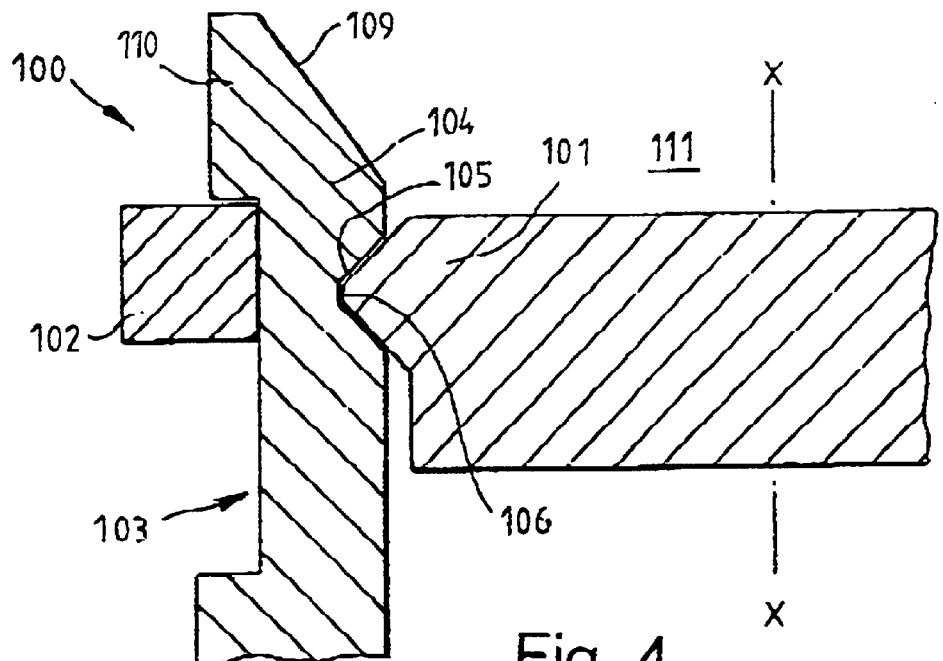
FIG. 4 is a view similar to FIG. 3 of the apparatus in a second operative position.

It will be understood that although a discharge outlet has been referred to and described in the description relating to the drawings, the invention is equally applicable to an inlet for material to a container such as an IBC. Such an apparatus 100 is shown in FIGS. 3 and 4, which both show a lid 101 situated at an inlet 111 to an IBC, line X—X being the central axis thereof. There is an integral annular member 102 which is received in a recess or rebate 103 in an annular flexible, suitably elastomeric, seal or lock 104 which has on a face opposite the face with the rebate or recess, a notch or annular groove 105 of generally complementary configuration to a peripheral nose or lip 106 of the lid 101. In the first, unlocked, operative position, FIG. 3, the integral member 102 is at the bottom of the rebate 103 and a deflector device 107 engages the seal to deflect the seal 104 on complementary surfaces 108, 109 outwardly at a part 110 so releasing the nose 106 of the lid 101 from the annular groove 105. The lid 101 can now be raised to open a flow path for material into the IBC. In the second, locked, operative position, FIG. 4, the deflector device 107 has retracted upwardly as viewed, so the seal 104 flexes clockwise as viewed under its natural resilience, and the integral member 102 moves up the rebate 103, as viewed, to force the seal part 110 to the right as viewed so that the nose 106 is firmly held in the groove 105.

In all embodiments the locking member 5, 102 is an integral part of the apparatus, and is applicable to both inlets and outlets. The cone valve or lid can then be externally secured.

What is claimed is:

1. Apparatus for handling flowable particulate material, comprising an aperture having a closure device movable between a position to obturate the aperture and a position to allow flow of material therethrough, and an integral member which is adapted to secure the closure device in the obturated position, the closure device comprising a valve having an annular flexible seal and a substantially rigid retaining body, the integral member comprising a relatively rigid annular member slidably mounted inwardly of the flexible seal such that it is slidable relative to the retaining body, the integral member further comprising a free boundary edge part adapted to urge the flexible seal against the aperture to effect securing of the valve in the aperture when the integral member is in a closed position.

2. Apparatus according to claim 1, the aperture being an outlet of the apparatus and the closure device being a discharge valve.

3. Apparatus according to claim 1, further comprising limit means for limiting relative slidable movement of the retaining body and the integral member.

4. Apparatus according to claim 3 the limit means comprising complementary stepped parts of each of the retaining body and the integral member.

5. Apparatus according to claim 1, the integral member comprising a ring of relatively rigid polyethylene.

6. Apparatus according to claim 1, further comprising retaining means to retain the integral member below the discharge valve.

7. Apparatus according to claim 6, the retaining means comprising a spider.

8. Apparatus according to claim 1, the aperture being an inlet of the apparatus and the closure device being a lid of the apparatus.

9. Apparatus according to claim 8, the integral member being housed in a rebate of a seal.

10. A materials handling system, comprising the apparatus according to claim 1, and a station for charging or discharging of material through the aperture.

11. A system according to claim 10, the station comprising a discharge station and means to move the integral member to secure the closure device in the obturated position.

12. Apparatus according to claim 1, wherein the free boundary edge part is further adapted to release the flexible seal away from the aperture when the integral member is in an open position, such that the closure device may be lifted through the aperture to allow the material to flow through the aperture.

* * * * *